United States Patent
Dow et al.

(10) Patent No.: US 9,619,594 B1
(45) Date of Patent: Apr. 11, 2017

(54) CONFIGURATION OF LARGE SCALE ADVECTION DIFFUSION MODELS WITH PREDETERMINED RULES

(71) Applicant: INTERNATIONAL BUSINESS MACHINES CORPORATION, Armonk, NY (US)

(72) Inventors: Eli M. Dow, Wappingers Falls, NY (US); Ying Liu, Austin, TX (US); Fearghal O'Donncha, Galway (IE); Emanuele Ragnoli, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/951,692

(22) Filed: Nov. 25, 2015

(51) Int. Cl.
G06F 17/10 (2006.01)
G06F 17/50 (2006.01)

(52) U.S. Cl.
CPC .......... *G06F 17/5009* (2013.01); *G06F 17/10* (2013.01)

(58) Field of Classification Search
None
See application file for complete search history.

(56) References Cited

U.S. PATENT DOCUMENTS

| 5,640,331 | A * | 6/1997 | Dahm ................. G06F 17/5018 23/306 |
| 7,229,593 | B1 | 6/2007 | Ho |
| 7,930,155 | B2 | 4/2011 | Zhang et al. |
| 8,949,096 | B2 | 2/2015 | Jolliff |
| 2008/0177518 | A1* | 7/2008 | Krishnamoorthy . G06F 17/5009 703/9 |
| 2014/0024932 | A1 | 1/2014 | Sharma et al. |
| 2014/0136174 | A1* | 5/2014 | Audigier ............. G06F 19/3437 703/11 |

FOREIGN PATENT DOCUMENTS

| EP | 1607765 A2 | 12/2005 |
| WO | 2015031531 A1 | 3/2015 |

OTHER PUBLICATIONS

Costa et al. Semi-Analytical Solution of the Steady Three-Dimensional Advection-Diffusion Equation in the Planetary Boundary Layer Atmospheric Environment 40, 2006, pp. 5659-5660.*

(Continued)

*Primary Examiner* — Omar Fernandez Rivas
*Assistant Examiner* — Cuong Luu
(74) *Attorney, Agent, or Firm* — Cantor Colburn LLP; David Quinn

(57) ABSTRACT

A computer-implemented method for configuring an advection diffusion model may include retrieving, via a processor, a plurality of advection diffusion model parameters indicative of model extremes of the advection diffusion model, retrieving, via the processor, convergence area information indicative of a convergence area for the advection diffusion model, determining, via the processor, an accuracy metric for each of the plurality of advection diffusion model parameters, selecting, via the processor, an optimal advection diffusion model parameter from the plurality of advection diffusion model parameters, and configuring, via the processor, the advection diffusion model with the optimal advection diffusion model parameter.

17 Claims, 5 Drawing Sheets

(56) References Cited

OTHER PUBLICATIONS

Ragnoli et al. Domain Decomposition for a LInear Advection-Diffusion Equation by Menas of Minimax Filtering Control Conference (ECC), Jun. 24-27, 2014.*
Liu et al. Stability and Convergenece of the Difference Methods for the Space-Time Fraction Advection-Diffusion Equation Applied Mathematics and Computation 191, 2007, pp. 12-20.*
Akkerman et al.; A variational Germano approach for stabilized finite element methods; Computer methods in applied mechanics and engineering 199.9 (2010): 502-513.
Burstedde et al.; Towards Adaptive Mesh PDE Simulations on Petascale Computers; In Proceedings of Teragrid '08, 2008.
Kasnakoglu; Control of Nonlinear Systems Represented by Galerkin Models Using Adaptation-based Linear Parameter-varying Models; International Journal of Control, Automation, and Systems (2010) 8(4):748-761.
Majewski et al.; The Operational Global Icosahedral—Hexagonal Gridpoint Model GME: Description and High-Resolution Tests; Monthly Weather Review 130.2 (2002): 319-338.
Minev et al.; A characteristic/®nite element algorithm for the 3-D Navier±Stokes equations using unstructured grids; Computer methods in applied mechanics and engineering 178.1 (1998): 39-50.

* cited by examiner

CONFIGURATION OF LARGE SCALE ADVECTION DIFFUSION MODELS WITH PREDETERMINED RULES

BACKGROUND

The present disclosure relates to advection diffusion models, and more specifically, to configuring an advection diffusion model with predetermined rules.

The initialization of circulation models for large water bodies is a very challenging problem that usually requires computing power at the level of supercomputers such as, for example, the BLUE GENE or the IBM POWER computing system by International Business Machines (IBM). In other aspects, the super-computing may be performed in a distributed fashion using a multitude of remotely connected processors across a network. Advanced computing capabilities are often required to compute intricate mathematical models of dynamically changing systems having complex behavioral parameters, which may be tuned to reflect peculiarities with respect to natural phenomena.

For example, in order to tune a model set of parameters for ocean water diffusion, model parameters including turbulence, bed heating exchange, solar radiation etc. are decided. Current methods may include choosing test parameters, running instances of the selected parameters, and analyzing the results to select the optimal set of parameters for the given problem at hand. Running instances of the circulation model is both computationally and time demanding. For example, the selected parameters must be tuned to reflect natural phenomena related to the particular problem. Tuning the model often involves a domain expert to make educated estimations on the physical reality of materials, the conditions of the water body and surroundings, and run various sets set of parameters.

By way of another example, the tracking and forecasting of an oil spill in a water environment may be done with advection-diffusion-reaction equations that are parameter-dependent. As above, the process of parametrization often requires a domain expert that makes educated guesses on possible parameters settings, who then verifies the models with a series of model runs, where each of the runs may have a distinct set of validation data. This common approach for diffusion model configuration can be labor intense, expensive, and computationally complex.

SUMMARY

According to some embodiments, a computer-implemented method for configuring an advection diffusion model is described. The method may include retrieving, via a processor, a plurality of advection diffusion model parameters indicative of model extremes of the advection diffusion model, retrieving, via the processor, convergence area information indicative of a convergence area for the advection diffusion model, determining, via the processor, an accuracy metric for each of the plurality of advection diffusion model parameters, selecting, via the processor, an optimal advection diffusion model parameter from the plurality of advection diffusion model parameters, and configuring, via the processor, the advection diffusion model with the optimal advection diffusion model parameter.

According to other embodiments, a system for configuring an advection diffusion model is described. The system may include a processor configured to retrieve a plurality of advection diffusion model parameters indicative of model extremes of the advection diffusion model, retrieve convergence area information indicative of a convergence area for the advection diffusion model, determine an accuracy metric for each of the plurality of advection diffusion model parameters, select an optimal advection diffusion model parameter from the plurality of advection diffusion model parameters, and configure the advection diffusion model with the optimal advection diffusion model parameter.

According to yet other embodiments, a non-transitory computer-readable storage medium is described. The non-transitory storage medium may include program instructions that are executable by a processor to perform a method for configuring an advection diffusion model. The method may include retrieving, via a processor, a plurality of advection diffusion model parameters indicative of model extremes of the advection diffusion model, retrieving, via the processor, convergence area information indicative of a convergence area for the advection diffusion model, determining, via the processor, an accuracy metric for each of the plurality of advection diffusion model parameters, selecting, via the processor, an optimal advection diffusion model parameter from the plurality of advection diffusion model parameters, and configuring, via the processor, the advection diffusion model with the optimal advection diffusion model parameter.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
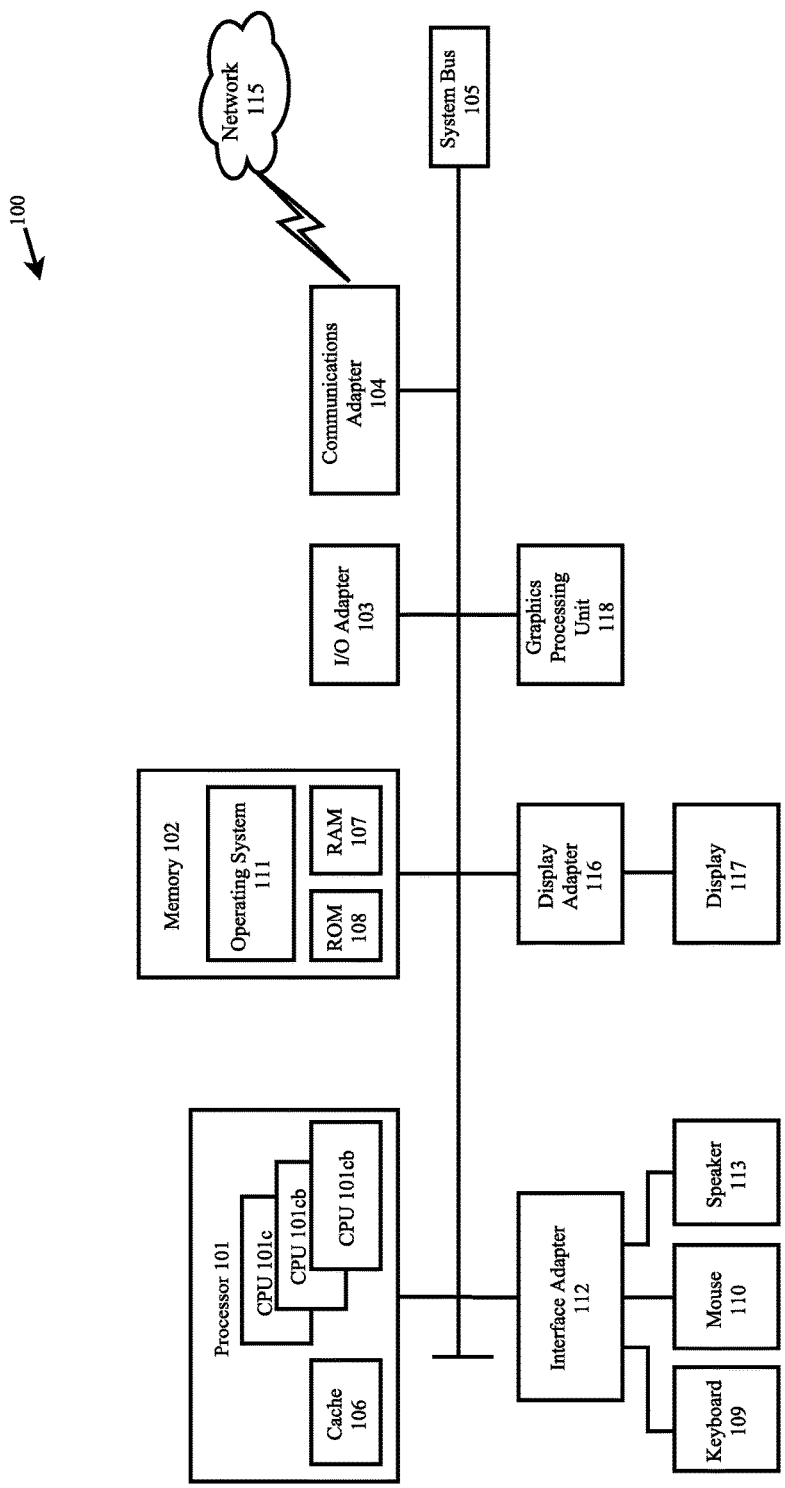
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input/output adaptors 103, that may be communicatively coupled via system bus 105. Memory 102 may be operatively coupled to one or more internal or external memory devices. Communications adaptor 104 may be operatively connect computer 100 to one or more networks 115. A system bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more input/output (I/O) devices to computer 100. For example, interface adaptor 112 may connect a keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Large scale advection diffusion models are characterized by set of parameters that require tuning at the initialization phase of the model. Large scale simulations with advection diffusion models are often performed on high performance computing (HPC) structures, and can require long machine computational time, which may be expensive from both a financial standpoint and a human labor standpoint. For example, large scale advection diffusion model simulations may be conducted by a consultant or domain expert having domain-specific knowledge (e.g., an ocean fluids diffusion expert may have extensive knowledge of the biology and physicist of ocean fluid diffusion). The domain expert may use specific knowledge to make estimations of optimal values of parameters for initializing the simulation model. The estimations are generally referred to as parameter settings. After estimating several of the best candidate parameter settings, the domain expert often launches a set of simulations having fixed time periods with each of the different parameters settings, and then matches the simulation results with validation data to form a final decision on the optimal parameters settings based on a set of statistical metrics.

As described previously, existing methodologies for configuring and/or tuning parameter settings for large scale advection diffusion models may include application of various statistical approaches, such as, for example, Monte Carlo analysis. This approach is not generally optimal for large scale systems because it may not be directed by a domain expert (that is, user-defined rules are not used), which may be computationally demanding for larger-scale models.

In other aspects, some practitioners may apply adjoint/inverse methods for configuring parameter settings. Like Monte Carlo, adjoint/inverse methods may be computation-heavy and may also require custom coding of an adjoint model.

Other approaches may apply a design of experiment (DOE) method, where samples from a subset of a full factorial parameter space are selected. This approach may take $k^n$ evaluations, where n is the dimension of the parameter space), which also proves to be computationally expensive.

In yet other conventional approaches, some practitioners may apply a PEST style approach, which is based on the Levenberg-Marquardt algorithm. With this approach, some practitioners may optionally apply the Tikhonov regularization algorithm. In either case, this approach may not be suited to larger-scale diffusion models.

Figure 2:
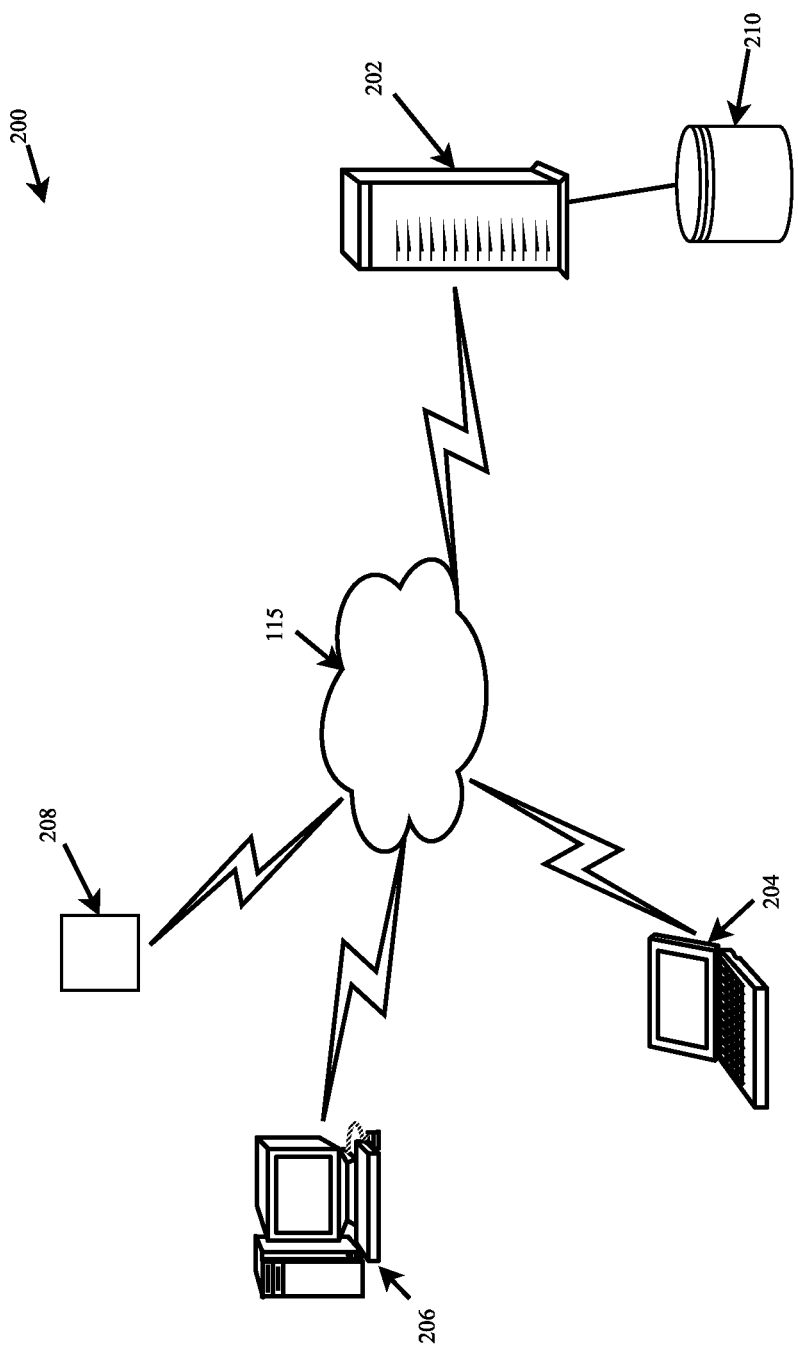
FIG. 2 depicts a computing environment for configuring an advection diffusion model in accordance with an exemplary embodiment.

Accordingly, it may be advantageous to provide methods and systems for automating the configuration of an advection diffusion model with parameters chosen by the system based on predetermined rules. Referring now to FIG. 2, a computing environment 200 for performing a method for configuring an advection diffusion model with predetermined rules is described, in accordance with an exemplary embodiment.

In some aspects, computing environment 200 may include computing system 202, which may be connected to database 210. Computing environment 200 may further include one or more devices including, for example, computing systems 204, 206, etc. Computing environment 200 may further include a plurality of sensors 208. Sensors 208, computing systems 204 and 206, and computing system 202 may be operatively connected via network 115.

Computing system 202 may be a high performance computing (HPC) apparatus. An HPC may embody a high-level computational capacity compared to a general-purpose computer. HPCs may also exhibit super-computing performance, which may be measured in floating-point operations per second (FLOPS) instead of million instructions per second (MIPS). As of 2015, there are supercomputers which can perform up to quadrillions of FLOPS.

Computing system 202 may also be a distributed computing system having a large number of discrete computers (e.g., computing systems 204, 206, etc.) distributed across a network 115. According to some embodiments, computing systems 204, 206, etc., when configured as a distributed computing environment, may devote some or all of their time to solving a common problem. Accordingly, each individual computer (client) may receive small tasks from a central computing system (e.g., computing system 202) and completes the many small tasks independently, then report the results to computing system 202. In some aspects, computing system 202 may integrate the task results from all the client computing systems into the overall solution.

Sensors 208 may be sensors configured to receive environmental, physical, electrical, and/or other types of signals that may be used by computing system 202 to configure an advection diffusion model, tune the model, and create optimized testing parameters.

Figure 3:
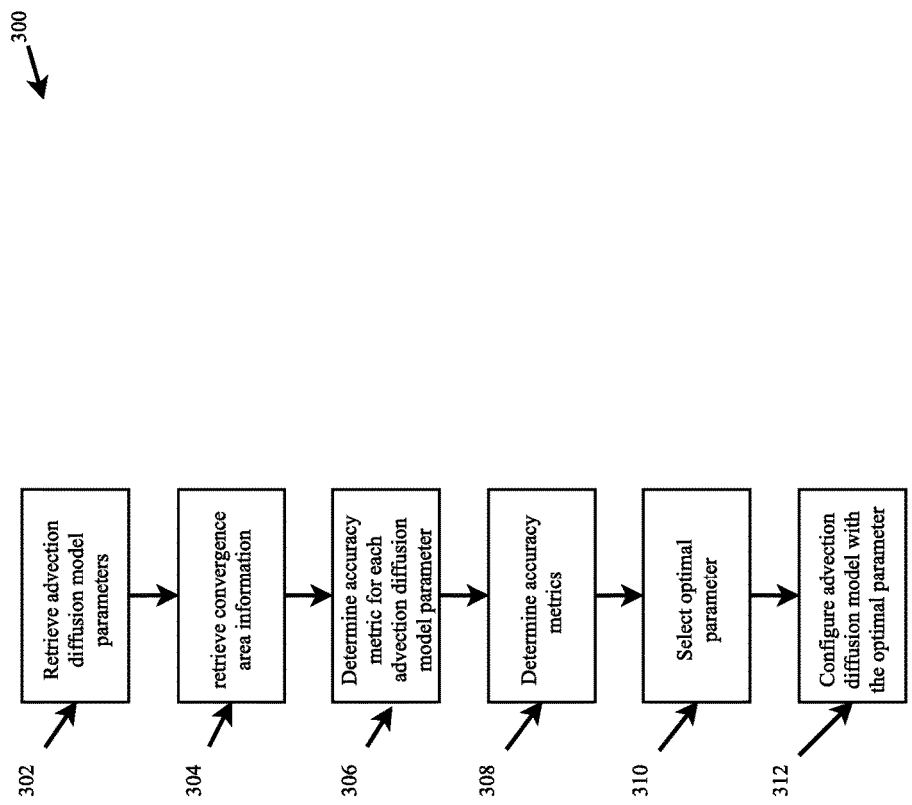
FIG. 3 depicts a flow diagram of a method for configuring an advection diffusion model in accordance with an exemplary embodiment.

Referring now to FIG. 3, a flow diagram of a method 300 for configuring an advection diffusion model is depicted, in accordance with an exemplary embodiment. As shown in block 302, computing system 202 (hereafter "system 202") may be configured to retrieve a plurality of advection diffusion model parameters. Because time and space scales in fluid flow analysis are finite, their resolutions may be increased in cases where physical phenomena cannot be described naturally. In these cases, a mathematical model based on the laws of physics may be used to estimate or model potential and/or probable outcomes based on advection diffusion model parameters. Advection diffusion parameters, which are known in the art, may model various aspects of diffusion phenomena such as, for example, turbulence, flow, etc. In some aspects, diffusion model parameters may be indicative of model extremes of the advection diffusion model.

According to some embodiments, each of the plurality of advection diffusion model parameters may include a plurality of parameter sets for configuring the advection diffusion model. Accordingly, each set of parameters may include at least one setting for configuring the advection diffusion model different from the other parameter sets.

As shown in block 304, system 202 may retrieve convergence area information indicative of a convergence area for the advection diffusion model. In some aspects, convergence area information may be provided from an external source, such as, for example, a user (not shown). According to some embodiments, system 202 may prompt a user for convergence information, receive the information, and save the convergence information to an operatively connected computer memory.

Convergence information may include information indicative of whether a particular parameter solution is convergent. In some aspects numerical models may be convergent when sequences of model solutions having solution domains that are increasingly defined approach a fixed value. Furthermore, a numerical model can be consistent if this sequence converges to the solution of the continuous equations which govern the physical phenomenon being modeled.

As shown in block 306, system 202 may determine an accuracy metric for each of the plurality of advection diffusion model parameters. Accordingly, system 202 may access one or more databases (e.g., database 210) having residual error information for each of the plurality of parameters.

Figure 4:
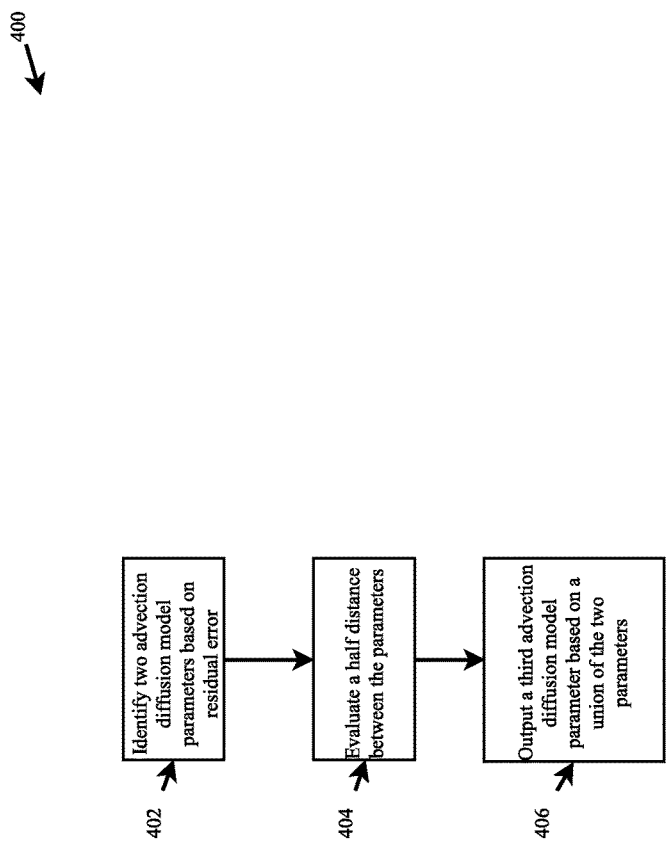
FIG. 4 depicts a flow diagram of a method for selecting an optimal advection diffusion model parameter in accordance with an exemplary embodiment.

In some aspects, system 202 may select an optimal advection diffusion model parameter from the plurality of advection diffusion model parameters. FIG. 4 describes a flow diagram 400 of a method for selecting the optimal advection diffusion model parameter.

Referring now to FIG. 4, according to some embodiments, as shown in block 402, selecting the optimal advection diffusion model parameter may include identifying two advection diffusion model parameters from the plurality of advection diffusion model parameters. In some aspects system 202 may make identification based on a record of residual error retrieved from database 210.

Figure 5:
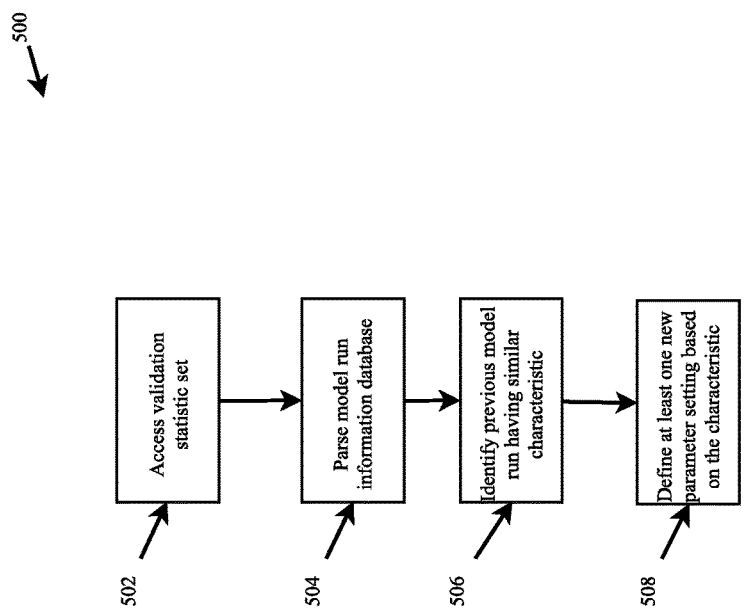
FIG. 5 depicts a flow diagram of a method for determining accuracy of a metric in accordance with an exemplary embodiment.

As shown in block 404, system 202 may evaluate a half distance between the two advection diffusion model parameters. In some aspects, the user-defined convergence area information may include acceptable convergence area that has been selected by the user. Accordingly, system 202 may run two selected instances of the model based on the model parameter (convergence area) settings. Accordingly, system 202 may calculate a residual error for each of the plurality of two advection diffusion model parameters. FIG. 5 depicts a flow diagram 500 of a method for determining accuracy of a metric, in accordance with an exemplary embodiment.

Referring briefly to FIG. 5, as shown in block 502, calculating residual error may include accessing a validation statistic set in database 210. Database 210 may include a database of model run information that can include parameter settings from a plurality of previous advection diffusion model runs. Accordingly, system 202 may parse model run information in the database, as shown in block 504, and identify a previous model run from the model run information, where the previous model run includes at least one characteristic similar to advection diffusion model (as shown in block 506).

According to some embodiments, system 202 may define at least one new parameter setting for the advection diffusion model based on an accuracy metric of the at least one characteristic, as shown in block 508. Defining the one new parameter setting may include redefining a second selected parameter as half the distance between the first and second selected parameter. In some aspects, system 202 may compute a sub-setting parameter C as half the distance between the first and second selected parameters. Accordingly, parameter C may be the union of the first and second parameters.

Referring again to FIG. 4, after evaluating a half distance between the parameters, in some embodiments, as shown in block 406, system 202 may output a third advection diffusion model parameter (e.g., parameter C), where the third advection model parameter is a union of the two advection diffusion model parameters having optimal advection diffusion model parameter settings.

Referring again to FIG. 3, after selecting the optimal parameter at block 308, system 202 may configure the advection diffusion model with the optimal advection diffusion model parameter, as shown in block 310.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions IBM Confidential; Attorney Work Product; Attorney Client Privileged Aug. 24, 2015 D-2 by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for configuring an advection diffusion model, the computer-implemented method comprising:
   retrieving, via a processor, a plurality of advection diffusion model parameters indicative of model extremes of the advection diffusion model;
   retrieving, via the processor, convergence area information indicative of a convergence area for the advection diffusion model;
   determining, via the processor, an accuracy metric for each of the plurality of advection diffusion model parameters;
   selecting, via the processor, an optimal advection diffusion model parameter from the plurality of advection diffusion model parameters, wherein selecting the optimal advection diffusion model parameter comprises:
   identifying two advection diffusion model parameters from the plurality of advection diffusion model parameters, wherein the identification is based on residual error;
   evaluating a half distance between the two advection diffusion model parameters; and
   outputting a third advection diffusion model parameter, wherein the third advection diffusion model parameter is a union of the two advection diffusion model parameters comprising at least one characteristic similar to the advection diffusion model and at least one new parameter setting for the advection diffusion model based on an accuracy metric of the at least one characteristic; and
   configuring, via the processor, the advection diffusion model with the optimal advection diffusion model parameter.

2. The computer-implemented method of claim 1, wherein each of the plurality of advection diffusion model parameters comprises a plurality of parameter sets for configuring the advection diffusion model, each set having at least one setting for configuring the advection diffusion model different from the other parameter sets.

3. The computer-implemented method of claim 1, wherein determining the accuracy metric for each of the plurality of advection diffusion model parameters comprises:
   accessing a validation statistic set;
   parsing a database of model run information comprising parameter settings from a plurality of previous advection diffusion model runs;
   identifying a previous model run from the model run information, wherein the previous model run comprises at least one characteristic similar to the advection diffusion model; and
   defining at least one new parameter setting for the advection diffusion model based on an accuracy metric of the at least one characteristic.

4. The computer-implemented method of claim 3, further comprising
   running the advection diffusion model and recording a result; and
   determining an accuracy based on the result and the validation statistic set.

5. The computer-implemented method of claim 4, further comprising updating the database of model run information with an update indicative of at least one characteristic, wherein the update comprises the accuracy.

6. The computer-implemented method of claim 1, wherein selecting the optimal advection diffusion model parameter from the plurality of advection diffusion model parameters is based on an accuracy metric and the convergence area information.

7. A system for configuring an advection diffusion model comprising a processor configured to:
   retrieve a plurality of advection diffusion model parameters indicative of model extremes of the advection diffusion model;
   retrieve convergence area information indicative of a convergence area for the advection diffusion model;
   determine an accuracy metric for each of the plurality of advection diffusion model parameters;
   select an optimal advection diffusion model parameter from the plurality of advection diffusion model parameters, wherein the optimal advection diffusion model parameter comprises:

two advection diffusion model parameters identified from the plurality of advection diffusion model parameters, wherein the identification is based on residual error;

an evaluation of a half distance between the two advection diffusion model parameters; and a third advection diffusion model parameter, wherein the third advection diffusion model parameter is output by the processor as a union of the two advection diffusion model parameters comprising at least one characteristic similar to the advection diffusion model and at least one new parameter setting for the advection diffusion model based on an accuracy metric of the at least one characteristic; and configure the advection diffusion model with the optimal advection diffusion model parameter.

8. The system of claim 7, wherein each of the plurality of advection diffusion model parameters comprises a plurality of parameter sets for configuring the advection diffusion model, each set having at least one setting for configuring the advection diffusion model different from the other parameter sets.

9. The system of claim 7, wherein the processor is further configured to:

access a validation statistic set;

parse a database of model run information comprising parameter settings from a plurality of previous advection diffusion model runs;

identify a previous model run from the model run information, wherein the previous model run comprises at least one characteristic similar to advection diffusion model; and define at least one new parameter setting for the advection diffusion model based on the accuracy metric of the at least one characteristic.

10. The system of claim 9, wherein the processor is further configured to:

run the advection diffusion model and record a result; and determine an accuracy based on the result and the validation statistic.

11. The system of claim 10, wherein the processor is further configured to update the database of model run information with an update indicative of at least one characteristic, wherein the update comprises the accuracy.

12. The system of claim 7, wherein the processor is configured to select the optimal advection diffusion model parameter from the plurality of advection diffusion model parameters based on an accuracy metric and the convergence area information.

13. A non-transitory computer-readable storage medium having program instructions embodied therewith, the instructions executable by a processor to cause the processor to perform a method for configuring an advection diffusion model, the method comprising:

retrieving, via a processor, a plurality of advection diffusion model parameters indicative of model extremes of the advection diffusion model;

retrieving, via the processor, convergence area information indicative of a convergence area for the advection diffusion model;

determining, via the processor, an accuracy metric for each of the plurality of advection diffusion model parameters;

selecting, via the processor, an optimal advection diffusion model parameter from the plurality of advection diffusion model parameters, wherein selecting the optimal advection diffusion model parameter comprises:

identifying two advection diffusion model parameters from the plurality of advection diffusion model parameters, wherein the identification is based on residual error;

evaluating a half distance between the two advection diffusion model parameters; and outputting a third advection diffusion model parameter, wherein the third advection diffusion model parameter is a union of the two advection diffusion model parameters comprising at least one characteristic similar to the advection diffusion model and at least one new parameter setting for the advection diffusion model based on an accuracy metric of the at least one characteristic; and configuring, via the processor, the advection diffusion model with the optimal advection diffusion model parameter.

14. The non-transitory computer-readable storage medium of claim 13, wherein each of the plurality of advection diffusion model parameters comprises a plurality of parameter sets for configuring the advection diffusion model, each set having at least one setting for configuring the advection diffusion model different from the other parameter sets.

15. The non-transitory computer-readable storage medium of claim 13, wherein determining the accuracy metric for each of the plurality of advection diffusion model parameters comprises:

accessing a validation statistic set;

parsing a database of model run information comprising parameter settings from a plurality of previous advection diffusion model runs;

identifying a previous model run from the model run information, wherein the previous model run comprises at least one characteristic similar to advection diffusion model; and defining at least one new parameter setting for the advection diffusion model based on the accuracy metric of the at least one characteristic.

16. The non-transitory computer-readable storage medium of claim 15, further comprising:

running the advection diffusion model and recording a result;

determining an accuracy based on the result and the validation statistic set.

17. The non-transitory computer-readable storage medium of claim 16, further comprising updating the database of model run information with an update indicative of at least one characteristic, wherein the update comprises the accuracy.

* * * * *